United States Patent
Kamiya

(10) Patent No.: US 8,835,572 B2
(45) Date of Patent: Sep. 16, 2014

(54) ALUMINUM CHELATE LATENT CURING AGENT

(75) Inventor: Kazunobu Kamiya, Tochigi (JP)

(73) Assignee: Dexerials Corporation, Tokyo (JP)

( * ) Notice: Subject to any disclaimer, the term of this patent is extended or adjusted under 35 U.S.C. 154(b) by 224 days.

(21) Appl. No.: 13/320,996

(22) PCT Filed: Jun. 17, 2011

(86) PCT No.: PCT/JP2011/063930
§ 371 (c)(1),
(2), (4) Date: Nov. 17, 2011

(87) PCT Pub. No.: WO2012/002177
PCT Pub. Date: Jan. 5, 2012

(65) Prior Publication Data
US 2012/0119156 A1    May 17, 2012

(30) Foreign Application Priority Data

Jun. 28, 2010  (JP) .................................. 2010-146468

(51) Int. Cl.
| | | |
|---|---|---|
| C08G 18/00 | (2006.01) | |
| C08F 283/00 | (2006.01) | |
| C08G 59/14 | (2006.01) | |
| C08L 63/00 | (2006.01) | |
| C09K 3/00 | (2006.01) | |
| C08J 9/00 | (2006.01) | |
| C08G 59/70 | (2006.01) | |
| C08G 65/18 | (2006.01) | |
| C08G 18/62 | (2006.01) | |
| C08G 18/08 | (2006.01) | |
| C09J 163/00 | (2006.01) | |
| C08G 18/80 | (2006.01) | |
| C08K 5/00 | (2006.01) | |
| C08K 9/10 | (2006.01) | |

(52) U.S. Cl.
CPC ................ *C08G 59/70* (2013.01); *C08L 63/00* (2013.01); *C08G 65/18* (2013.01); *C08K 5/0091* (2013.01); *C08G 18/6212* (2013.01); *C08K 9/10* (2013.01); *C08G 18/0866* (2013.01); *C09J 163/00* (2013.01); *C08G 18/8029* (2013.01)
USPC ........ 525/452; 252/182.13; 521/90; 521/123; 521/153; 521/155; 525/528

(58) Field of Classification Search
USPC ......................................... 525/528
See application file for complete search history.

(56) References Cited

U.S. PATENT DOCUMENTS

| | | |
|---|---|---|
| 2005/0107494 A1 | 5/2005 | Matsushima et al. |
| 2008/0319110 A1 | 12/2008 | Kamiya et al. |

(Continued)

FOREIGN PATENT DOCUMENTS

| | | |
|---|---|---|
| JP | A-2002-212537 | 7/2002 |
| JP | A-2003-238656 | 8/2003 |

(Continued)

OTHER PUBLICATIONS

International Search Report issued in International Patent Application No. PCT/JP2011/063930 mailed Jul. 12, 2011.

(Continued)

*Primary Examiner* — Peter F Godenschwager
*Assistant Examiner* — David Karst
(74) *Attorney, Agent, or Firm* — Oliff PLC

(57) ABSTRACT

A novel aluminum chelate latent curing agent that can cure a glycidyl ether epoxy compound at a lower temperature and more quickly than an aluminum chelate latent curing agent produced by emulsification and interfacial polymerization of a polyfunctional isocyanate in the presence of both a radical polymerizable monomer, such as divinyl benzene, and a radical polymerization initiator, is micro-encapsulated in a core-shell form, wherein an aluminum chelate curing agent and a cationic polymerizable compound are included in a capsule formed from an interfacial polymerization product of a polyfunctional isocyanate.

15 Claims, 7 Drawing Sheets

(56) References Cited

U.S. PATENT DOCUMENTS

| | | |
|---|---|---|
| 2009/0152504 A1 | 6/2009 | Komuro et al. |
| 2009/0230360 A1 | 9/2009 | Komuro et al. |
| 2010/0249338 A1 | 9/2010 | Kamiya |
| 2010/0324170 A1 | 12/2010 | Kamiya |

FOREIGN PATENT DOCUMENTS

| | | |
|---|---|---|
| JP | A-2006-70051 | 3/2006 |
| JP | A-2006-316259 | 11/2006 |
| JP | A-2008-179701 | 8/2008 |
| JP | A-2009-35693 | 2/2009 |
| JP | A-2009-51960 | 3/2009 |
| JP | A-2009-197206 | 9/2009 |
| WO | WO 2008/090719 A1 | 7/2008 |
| WO | WO 2009093364 A1 * | 7/2009 |

OTHER PUBLICATIONS

International Preliminary Report on Patentability issued in International Patent Application No. PCT/JP2011/063930 issued Jan. 15, 2013.

Office Action issued in Japanese Application No. 2010-146468 dated Jun. 4, 2013 (with translation).

Office Action issued in Korean Patent Application No. 2011-7030676 dated May 6, 2013 (with translation).

* cited by examiner

US 8,835,572 B2

ALUMINUM CHELATE LATENT CURING AGENT

TECHNICAL FIELD

The present invention relates to a core-shell microcapsule aluminum chelate latent curing agent which includes an aluminum chelate curing agent in a capsule formed from an interfacial polymerization product of a polyfunctional isocyanate.

BACKGROUND ART

As a curing agent exhibiting low-temperature fast-curing activity for an epoxy resin, a micro-encapsulated aluminum chelate latent curing agent has previously been proposed which holds an aluminum chelating agent in a porous resin obtained by interfacial polymerization of a polyfunctional isocyanate compound (Patent Document 1).

With a thermosetting epoxy resin composition that contains an epoxy compound and an aluminum chelate latent curing agent like that disclosed in Patent Document 1 for curing the epoxy compound, silanolate anions derived from a silane coupling agent need to be present to activate the curing agent. However, due to the problem that the silanolate anions attach to the β-position carbon of the epoxy group in the epoxy compound, thereby causing a polymerization termination reaction to occur, it is difficult to perform polymerization without the glycidyl ether epoxy compound, which is susceptible to a β-carbon addition reaction, causing a polymerization termination reaction to occur. Consequently, there is the problem that an alicyclic epoxy compound, which is not susceptible to an addition reaction onto the β-position carbon by silanolate anions, has to be used despite the high cost.

Therefore, in order to enable low-temperature fast-curing of a glycidyl ether epoxy compound with an aluminum chelate latent curing agent like that disclosed in Patent Document 1, it has been proposed that the mechanical nature of a porous microcapsule is improved and the thermal response speed during curing of the epoxy compound is increased (Patent Document 2). This can be achieved by using in the thermosetting epoxy resin composition an aluminum chelate latent curing agent as well as a highly sterically hindered silanol compound that has a specific chemical structure and that has not been used conventionally as a silane coupling agent, and further, when performing the interfacial polymerization of the polyfunctional isocyanate compound, by allowing both a radical polymerizable monomer, such as divinyl benzene, and a radical polymerization initiator to be copresent and copolymerized.

PRIOR ART LITERATURE

Patent Documents

[Patent Document 1] Japanese Patent Application Laid-Open No. 2006-70051
[Patent Document 2] Japanese Patent Application Laid-Open No. 2009-197206

SUMMARY OF THE INVENTION

Problems to be Solved by the Invention

However, with the thermosetting epoxy resin composition described in Patent Document 2 that contains a porous micro-encapsulated aluminum chelate latent curing agent like that disclosed in Patent Document 1, depending on the application, the low-temperature fast-curing properties cannot be said to be sufficient. Thus, there is a need to further improve the low-temperature fast-curing properties. Further, during the emulsification and interfacial polymerization reaction that is carried out when producing a latent curing agent, a radical polymerization reaction of a radical polymerizable monomer, such as divinyl benzene, occurs at the same time, so that some unreacted radical polymerizable monomer may remain in the porous microcapsule. If such unreacted radical polymerizable monomer does remain, this can adversely impact the properties of the cured product.

An object of the present invention is to solve the above-described problems in the conventional art. It is also an object of the present invention to provide a novel aluminum chelate latent curing agent that can cure a glycidyl epoxy compound at a lower temperature and more quickly than an aluminum chelate latent curing agent produced by emulsification and interfacial polymerization of a polyfunctional isocyanate in the presence of both a radical polymerizable monomer, such as divinyl benzene, and a radical polymerization initiator.

Means for Solving the Problems

The present inventor has found that the above objective could be achieved by, rather than micro-encapsulating an aluminum chelate curing agent, allowing an aluminum chelate curing agent along with a cationic polymerizable compound to be included in a capsule formed from an interfacial polymerization product of a polyfunctional isocyanate, thereby micro-encapsulating in a core-shell form. This completed the present invention.

Specifically, the present invention provides an aluminum chelate latent curing agent that is micro-encapsulated in a core-shell form, wherein an aluminum chelate curing agent and a cationic polymerizable compound are included in a capsule formed from an interfacial polymerization product of a polyfunctional isocyanate.

Further, the present invention provides a method for producing the above aluminum chelate latent curing agent that is micro-encapsulated in a core-shell form, wherein the method comprises emulsifying an oil phase formed by dissolving the polyfunctional isocyanate and the cationic polymerizable compound in a volatile organic solvent in an aqueous phase containing water, a dispersant, and a surfactant, and subjecting the polyfunctional isocyanate to interfacial polymerization while maintaining the emulsified state, thereby allowing the aluminum chelate curing agent and the cationic polymerizable compound to be included in a capsule formed from an interfacial polymerization product of the polyfunctional isocyanate.

In addition, the present invention provides a thermosetting epoxy resin composition, characterized by comprising the above-described aluminum chelate latent curing agent, a glycidyl ether epoxy compound, and a silanol compound represented by the formula (A).

$$(Ar)_m Si(OH)_n \qquad (A)$$

In the formula (A), m is 2 or 3, the sum of m and n is 4, and Ar represents an optionally substituted aryl group.

Advantages of the Invention

The aluminum chelate latent curing agent of the present invention is a core-shell microcapsule which includes an aluminum chelate curing agent along with a cationic polymerizable compound in a capsule formed from an interfacial polymerization product of a polyfunctional isocyanate. Since there is no silanol compound inside the microcapsule, the aluminum curing agent and the cationic polymerizable compound do not react. Further, for a thermosetting epoxy resin composition obtained by mixing a silanol compound and a glycidyl epoxy compound with the aluminum chelate latent curing agent of the present invention, if the microcapsule wall of the aluminum chelate latent curing agent breaks down due to pressure or heat, the glycidyl ether epoxy compound can be cationically polymerized by active species produced by the aluminum chelate curing agent and the cationic polymerizable compound reacting with the silanol compound.

BEST MODE FOR CARRYING OUT THE INVENTION

Figure 1:
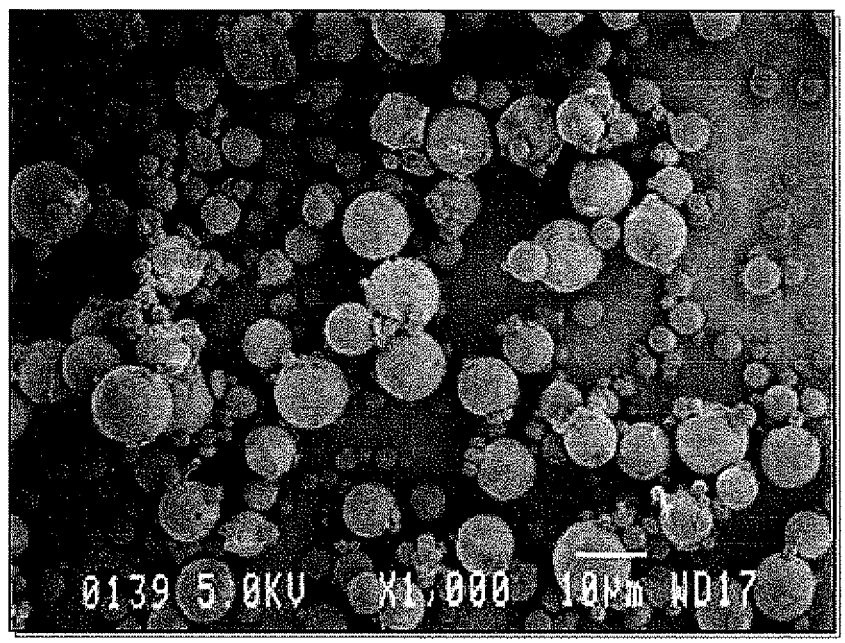
FIG. 1 is an electron micrograph of the aluminum chelate latent curing agent of Example 2.

The aluminum chelate latent curing agent of the present invention that is micro-encapsulated in a core-shell form includes an aluminum chelate curing agent and a cationic polymerizable compound in a capsule formed from an interfacial polymerization product of a polyfunctional isocyanate. Consequently, the curing temperature can be easily controlled by adjusting the thickness of the shell layer. Further, the aluminum chelate latent curing agent of the invention holds promise for applications as a pressure sensitive adhesive that involves the breakdown of the shell.

Since this aluminum chelate latent curing agent is produced utilizing an emulsification and interfacial polymerization method, it has a spherical shape. From the perspective of the curing properties and dispersion properties, it is preferred that the particle size be 0.1 to 50 μm, and more preferably 0.1 to 10 μm.

Further, if the degree of crosslinking of the capsule wall formed from an interfacial polymerization product of a polyfunctional isocyanate is too small, the latency of the aluminum chelate latent curing agent tends to deteriorate, while if the degree of crosslinking is too large, the thermal responsiveness tends to deteriorate. Therefore, it is preferred to adjust the degree of crosslinking based on the intended use. The degree of crosslinking of the capsule wall can be measured by a micro-compression test.

It is preferred that the aluminum chelate latent curing agent essentially contain none of the organic solvent that is used during the interfacial polymerization. More specifically, from the perspective of curing stability, it is preferred that the organic solvent content be 1 ppm or less.

<Aluminum Chelate Curing Agent>

Examples of the aluminum chelate curing agent forming the core of the aluminum chelate latent curing agent of the present invention that is micro-encapsulated in a core-shell form include the complex compound represented by the formula (1), in which three β-ketoenolate anions are coordinated to aluminum.

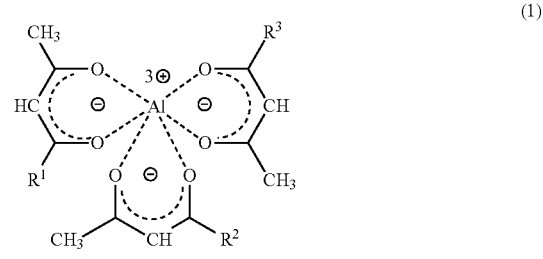

Here, $R^1$, $R^2$, and $R^3$ are each independently an alkyl group or an alkoxyl group. Examples of the alkyl group include a methyl group and an ethyl group. Examples of the alkoxyl group include a methoxy group, an ethoxy group, and an oleyloxy group.

Specific examples of the aluminum chelating agent represented by the formula (1) include aluminum tris(acetylacetonate), aluminum tris(ethylacetoacetate), aluminum monoacetylacetonate bis(ethylacetoacetate), aluminum monoacetylacetonate bis(oleylacetoacetate), ethylacetoacetate aluminum diisopropylate, and alkylacetoacetate aluminum diisopropylate.

<Cationic Polymerizable Compound>

Further, the cationic polymerizable compound that is included in the microcapsule along with the aluminum chelate curing agent is activated by an external silanol compound when the microcapsule is broken down, and is quickly cationically polymerized by the aluminum chelate curing agent. Therefore, by allowing such a cationic polymerizable compound to be included in the microcapsule along with the aluminum chelate curing agent, the low-temperature fast-curing properties of the aluminum chelate latent curing agent can be improved.

From the perspective of low-temperature fast curing properties, preferred examples of this cationic polymerizable compound include cyclic ether compounds. Among those, from the perspectives of compatibility with the aluminum chelating agent and fluidity, compounds that are liquid at room temperature are preferred. Preferred examples of such cyclic ether compounds include a polyfunctional glycidyl ether epoxy compound, alicyclic epoxy compound, and oxetane compound. Among these, it is preferred to use a polyfunctional alicyclic epoxy compound or oxetane compound. These cationic polymerizable compounds may respectively be used individually or together. When using an alicyclic epoxy compound and an oxetane compound together, with respect to 100 parts by mass of alicyclic epoxy compound, it is preferred to use 10 to 100 parts by mass of oxetane compound. Further, two kinds or more of cationic polymerizable compound can be mixed together and used.

Since a polyfunctional olefin compound such as divinyl benzene is radically polymerizable, there is no need to use a polyfunctional olefin compound in the present invention. Therefore, there is no need to be concerned about adverse effects caused by remaining radical polymerizable compounds after interfacial polymerization.

Preferred examples of the alicyclic epoxy compound include 3,4-epoxycyclohexylmethyl-3,4-epoxycyclohexane carboxylate (Cyracure UVR-6110 (manufactured by Union Carbide Corporation); Celloxide 2021P (manufactured by Daicel Chemical Industries, Ltd.)), 3,4-epoxycyclohexylethyl-3,4-epoxycyclohexane carboxylate, vinyl cyclohexene dioxide (ERL-4206 (manufactured by Union Carbide Corporation)), limonene dioxide (Celloxide 3000 (Daicel Chemical Industries, Ltd.)), allylcyclohexene dioxide, 3,4-epoxy-4-methylcyclohexyl-2-propylene oxide, 2-(3,4-epoxycyclohexyl-5,5-spiro-3,4-epoxy)cyclohexane-m-dioxane, bis(3,4-epoxycyclohexyl)adipate (Cyracure UVR-6128 (manufactured by Union Carbide Corporation)), bis(3,4-epoxycyclohexylmethyl)adipate, bis(3,4-epoxycyclohexyl)ether, bis(3,4-epoxycyclohexylmethyl)ether, and bis(3,4-epoxycyclohexyl)diethyl siloxane.

Preferred specific examples of the oxetane compound include bis(3-ethyl-3-oxetanylmethyl)ether, 3-ethyl-3-hydroxymethyloxetane, 1,4-bis{[(3-ethyl-3-oxetanyl)methoxy]methyl}benzene, 4,4'-bis[(3-ethyl-3-oxetanyl)methoxymethyl]biphenyl, bis[(3-ethyl-3-oxetanyl)]methyl 1,4-benzenedicarboxylate, 3-ethyl-3-(phenoxymethyl)oxetane, 3-ethyl-3-(2-ethylhexyloxymethyl)oxetane, 3-ethyl-3-{[3-(triethoxysilyl)propoxy]methyl}oxetane, oxetanyl silsesquioxane, and phenol novolac oxetane.

If the used amount of the above-described cationic polymerizable compound with respect to the aluminum chelate curing agent is too low, curing activity tends to decrease, while if the used amount is too high, the curing temperature tends to increase. Therefore, the used amount is, with respect to 100 parts by mass of aluminum chelate curing agent, preferably 10 to 300 parts by mass, and more preferably 10 to 100 parts by mass.

<Polyfunctional Isocyanate Compound>

The polyfunctional isocyanate compound forming the microcapsule wall preferably contains two or more, and more preferably three, isocyanate groups in one molecule. Preferred examples of such trifunctional isocyanate compounds include a trimethylolpropane (TMP) adduct obtained by reacting 1 mol of TMP with 3 mols of a diisocyanate compound, as represented by the formula (2); an isocyanurate obtained by self-condensation of 3 mols of a diisocyanate compound, as represented by the formula (3); and a biuret represented by the formula (4) obtained by condensation of diisocyanate urea obtained from 2 moles of 3 moles of a diisocyanate compound with the remaining 1 mol of the diisocyanate compound.

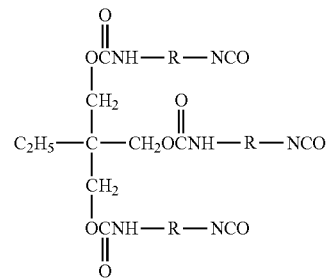

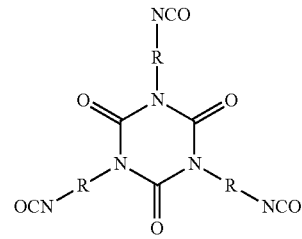

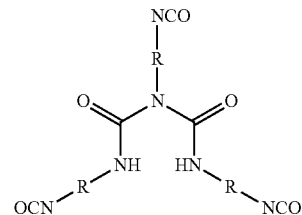

In the formulae (2) to (4), the substituent R is a moiety composed of a diisocyanate compound from which the isocyanate group was removed. Specific examples of such a diisocyanate compound include 2,4-toluene diisocyanate, 2,6-toluene diisocyanate, m-xylylene diisocyanate, hexamethylene diisocyanate, hexahydro-m-xylylene diisocyanate, isophorone diisocyanate, and 4,4'-methylenediphenyl diisocyanate.

In the capsule wall (capsule wall of a core-shell capsule) obtained by subjecting such a polyfunctional isocyanate compound to interfacial polymerization, some of the isocyanate groups are hydrolyzed into amino groups during the interfacial polymerization. These amino groups react with the isocyanate groups to form a urea bond, thereby forming a polymer. When an aluminum chelate latent curing agent having such a capsule wall is heated in order to carry out curing, the molecular chains of the polymer capsule wall loosen. Consequently, the included aluminum chelate curing agent and cationic polymerizable compound can come into contact with the below-described silanol compound represented by the formula (A) and glycidyl ether epoxy compound that are external to the latent curing agent, so that the curing reaction can be made to proceed.

Further, if the degree of crosslinking of the capsule wall formed from an interfacial polymerization product of a polyfunctional isocyanate is too small, the latency of the aluminum chelate latent curing agent tends to deteriorate, while if the degree of crosslinking is too large, the thermal responsiveness tends to deteriorate. Therefore, it is preferred to adjust the degree of crosslinking based on the intended use. The degree of crosslinking of the capsule wall can be measured by a micro-compression test.

If the total amount of the aluminum chelate curing agent and cationic polymerizable compound included in the capsule wall of the aluminum chelate latent curing agent is too small, thermal responsiveness tends to deteriorate, while if the total amount is too large, latency tends to deteriorate. Therefore, it is preferred that the aluminum chelate curing agent and the cationic polymerizable compound in a total amount of 100 to 2,000 parts by mass, and more preferably 100 to 1,000 parts by mass are included by 100 parts by mass of the capsule wall formed from the interfacial polymerization product of the polyfunctional isocyanate.

To improve the low-temperature fast curing properties of the aluminum chelate latent curing agent, the capsule wall may be subjected to an aluminum chelate curing agent solution impregnation treatment. Examples of the impregnation method include dispersing the aluminum chelate latent curing agent in an organic solvent (for example, ethanol), adding an aluminum chelate curing agent (for example, a solution of monoacetylacetonate bis(ethylacetoacetate) in isopropanol) into this dispersion, and stirring the resultant mixture at a temperature from room temperature to about 50° C. for several hours to one night.

<Production Method of Aluminum Chelate Latent Curing Agent>

The aluminum chelate latent curing agent of the present invention that is micro-encapsulated in a core-shell form can be produced by emulsifying an oil phase formed by dissolving a polyfunctional isocyanate and a cationic polymerizable compound in a volatile organic solvent in an aqueous phase containing water, a dispersant, and a surfactant, and subjecting the polyfunctional isocyanate to interfacial polymerization while maintaining the emulsified state, thereby allowing an aluminum chelate curing agent and a cationic polymerizable compound to be included in a capsule formed from an interfacial polymerization product of the polyfunctional isocyanate. This method will now be described in more detail.

In this production method, first, the aluminum chelate curing agent, the polyfunctional isocyanate compound, and the cationic polymerizable compound are dissolved in a volatile organic solvent to prepare a solution to serve as the oil phase in the interfacial polymerization. The reason for using a volatile organic solvent is as follows. Other organic solvents with high boiling points of more than 300° C. that are normally used in interfacial polymerization methods do not evaporate during the interfacial polymerization. Consequently, the probability of the isocyanate and water coming into contact with each other does not increase, so that the rate of progress in the interfacial polymerization between them is not sufficient. This makes it difficult to obtain a polymer product with good shape retention properties even by interfacial polymerization. Further, even if such a polymer product is obtained, the high boiling point solvent remains in the polymer product. When added into a thermosetting resin composition, the high boiling point solvent has an adverse impact on the physical properties of the cured thermosetting resin composition. For this reason, a volatile solvent is used for the organic solvent in the preparation of the oil phase.

It is preferred that the volatile organic solvent can effectively dissolve the aluminum chelate curing agent, the polyfunctional isocyanate compound, and the cationic polymerizable compound (i.e., each solubility of preferably 0.1 g/ml (organic solvent) or higher), be substantially incompatible with water (i.e., solubility in water of 0.5 g/ml (organic solvent) or less), and have a boiling point of 100° C. or less at atmospheric pressure. Specific examples of such volatile organic solvents include alcohols, acetates, and ketones. Of these, ethyl acetate is preferred because of its high polarity, low boiling point, and poor solubility in water.

If the used amount of the volatile organic solvent is too low with respect to a total amount of 100 parts by mass of the aluminum chelate curing agent, the polyfunctional isocyanate compound, and the cationic polymerizable compound, latency deteriorates, while if the used amount is too large, the capsule wall becomes porous and the thermal responsiveness deteriorates. Therefore, it is preferred that the used amount be 1 to 50 parts by mass, and more preferably 1 to 30 parts by mass. This added range is relatively less than the amount used to produce a conventional porous type aluminum chelate latent curing agent. Consequently, from the perspective of less organic solvent being used, the environmental burden is less than that in the conventional art.

If the used amount of the volatile organic solvent is within this range, the viscosity of the solvent serving as the oil phase can be reduced by using a comparatively large amount of volatile organic solvent. Moreover, since stirring efficiency improves if the viscosity is reduced, the oil phase droplets in the reaction system can become finer and more uniform. Consequently, while controlling the particle size of the obtained latent curing agent to a size in the general range of submicrons to a few microns, a monodisperse particle size distribution can be obtained. It is preferred to set the viscosity of the solvent serving as the oil phase to 1 to 300 mPa·s.

The dissolving of the aluminum chelate curing agent, the polyfunctional isocyanate compound, and the cationic polymerizable compound in the volatile organic solvent may be carried out just by mixing and stirring at room temperature under atmospheric pressure. Optionally, this may also be carried out by heating.

Next, in this production method, the oil phase solution obtained by dissolving the aluminum chelate curing agent, the polyfunctional isocyanate compound, and the cationic polymerizable compound in a volatile organic solvent is added to an aqueous phase including a dispersant, the resultant mixture is emulsified, and interfacial polymerization is carried out while maintaining the emulsified state. Examples of dispersants which can be used include dispersants used in ordinary interfacial polymerization, such as polyvinyl alcohol, carboxymethyl cellulose, gelatin and the like. The used amount of the dispersant is generally 0.1 to 10.0 mass % of the aqueous phase.

If the added amount of the oil phase solution with respect to the aqueous phase is too low, the particle size distribution becomes more varied, while if the added amount is too high, aggregates of fine particles are formed. Therefore, the added amount of the oil phase is preferably 5 to 50 parts by mass with respect to 100 parts by mass of the aqueous phase.

An example of the emulsification and interfacial polymerization conditions includes a stirring condition (stirring homogenizer, stirring rate of 8,000 rpm or higher) so that the size of the oil phase is preferably 1 to 30 μm, and a condition for heating and stirring, generally, at atmospheric pressure at 30 to 80° C. (preferably 50 to 80° C.) for a stirring time of 2 to 12 hours.

If PVA is used when emulsifying and dispersing the polyfunctional isocyanate compound, the polyfunctional isocyanate compound reacts with the hydroxyl group of the PVA. This results in the produced byproducts adhering to the periphery of the latent curing agent particles as foreign material. Further, this also causes the shape of the particles to deform. Examples of measures to prevent this phenomenon include promoting the reactivity between the polyfunctional isocyanate compound and water, or to suppress the reactivity between the polyfunctional isocyanate compound and the PVA.

To promote the reactivity between the polyfunctional isocyanate compound and water, the added amount of the aluminum chelate curing agent is preferably set to ½ or less, and more preferably ⅓ or less, the mass of the polyfunctional isocyanate compound. By setting in this manner, the probability of the polyfunctional isocyanate compound and the water coming into contact with each other increases, which makes it easier for the polyfunctional isocyanate compound and the water to react before the PVA comes into contact with the surface of the oil phase droplets.

One example of a method to suppress the reactivity between the polyfunctional isocyanate compound and the PVA is to increase the added amount of the aluminum chelate curing agent in the oil phase. Specifically, the added amount of the aluminum chelate latent curing agent is preferably set to be the same as, and more preferably 1.0 to 2.0 times, the mass of the polyfunctional isocyanate compound. Consequently, the isocyanate concentration on the surface of the oil phase droplets decreases. Further, since the polyfunctional isocyanate compound has a higher reaction (interfacial polymerization) rate with the amine formed by hydrolysis than a hydroxyl group, the reaction probability of the polyfunctional isocyanate compound and the PVA decreases.

The aluminum chelate latent curing agent of the present invention can be obtained by, after the interfacial polymerization is finished, separating the resulting polymer fine particles by filtration, and then allowing the separated particles to naturally dry. This method allows the curing properties of the aluminum chelate latent curing agent to be controlled by changing the type and used amount of the polyfunctional isocyanate compound, the type and used amount of the aluminum chelating agent and the interfacial polymerization conditions. For example, lowering the polymerization temperature enables the curing temperature to be decreased. Conversely, increasing the polymerization temperature enables the curing temperature to be increased.

<Thermosetting Epoxy Resin Composition>

Next, the thermosetting epoxy resin composition containing the aluminum chelate latent curing agent of the present invention will be described.

The thermosetting epoxy resin composition contains, in addition to the aluminum chelate latent curing agent of the present invention, a silanol compound that has a comparatively large steric hindrance and a glycidyl ether epoxy resin. Therefore, this thermosetting epoxy resin composition can be thermally polymerized without the glycidyl ether epoxy resin causing a polymerization termination reaction.

If the content of the aluminum chelate latent curing agent in the thermosetting epoxy resin composition is too small, the curing is not sufficient, while if the content is too large, the resin characteristics (flexibility etc.) deteriorate. Therefore, this content is 1 to 70 parts by mass, and preferably 1 to 50 parts by mass, with reference to 100 parts by mass of the glycidyl ether epoxy resin.

Unlike a conventional silane coupling agent that has a trialkoxy group, the silanol compound added to the thermosetting epoxy resin composition of the present invention is an aryl silanol that has a chemical structure represented by the following formula (A).

$$(Ar)_m Si(OH)_n \quad (A)$$

In the formula (A), m is 2 or 3, and the sum of m and n is 4. Therefore, the silanol compound represented by the formula (A) is a mono- or dial. "Ar" represents an optionally substituted aryl group. Examples of the aryl group include a phenyl group, a naphthyl group, an anthracenyl group, an azulenyl group, a fluorenyl group, a thienyl group, a furyl group, a pyrrolyl group, an imidazolyl group, and a pyridyl group. Of these, from the perspectives of ease of acquisition and acquisition cost, a phenyl group is preferred. The m number of Ar(s) may be the same or different. However, from the perspective of ease of acquisition, it is preferred that the m number of Ar(s) be the same.

These aryl groups can have 1 to 3 substituents. Examples of such substituents include: a halogen such as chloro and bromo; trifluoromethyl; nitro; sulfo; an alkoxy carbonyl such as carboxyl, methoxycarbonyl, and ethoxycarbonyl; an electron withdrawing group such as formyl; an alkyl such as methyl, ethyl, and propyl; an alkoxy such as methoxy and ethoxy; hydroxy; amino; a monoalkylamino such as monomethylamino; and an electron donating group such as a dialkylamino like dimethylamino. Since the acidity of the silanol hydroxyl group can be increased by using an electron withdrawing group as a substituent, and conversely, the acidity can be decreased by using an electron donating group, the curing activity can be controlled. Here, although the substituents may differ for each of the m number of Ar(s), from the perspective of ease of acquisition, it is preferred that substituents be the same for the m number of Ar(s). Further, some of the Ar(s) may have a substituent, while other Ar(s) may not.

Among the silanol compounds represented by the formula (A), preferred examples include triphenylsilanol and diphenylsilanol. Especially preferred is triphenylsilanol.

In the thermosetting epoxy resin composition of the present invention, regarding the content of the silanol compound represented by the formula (A), if the content ratio of this silanol compound with respect to the total of the silanol compound and the glycidyl ether epoxy resin is too low, curing is insufficient, while if the content ratio is too high, the resin characteristics (flexibility etc.) deteriorate. Therefore, it is preferred that this content ratio be 5 to 30 mass %, and more preferably 5 to 20 mass %.

The glycidyl ether epoxy compound forming the thermosetting epoxy resin composition of the present invention is used as a film-forming component. Such a glycidyl ether epoxy resin may be a liquid or a solid. Preferably, the glycidyl ether epoxy resin usually has an epoxy equivalent of about 100 to 4,000, and has 2 or more epoxy groups in the molecule. Examples thereof include a bisphenol A epoxy compound, a bisphenol F epoxy compound, a phenol novolac epoxy compound, a cresol novolac epoxy compound, and an ester epoxy compound. Of these, from the perspective of resin characteristics, it is preferred to use a bisphenol A epoxy compound or a bisphenol F epoxy compound. Further, monomers, oligomers, and polymers of such examples may also be used as the epoxy compound. Two or more kinds of these epoxy compounds may be mixed together for use.

In addition to the glycidyl ether epoxy compound, the thermosetting epoxy resin composition of the present invention can also include as a resin component the alicyclic epoxy compound and oxetane compound exemplified as the cationic polymerizable compound to be included in the capsule. When using an oxetane compound, the amount used is preferably 10 to 100 parts by mass, and more preferably 20 to 70 parts by mass, with respect to 100 parts by mass of the epoxy resin.

Separately from the silanol compound represented by the formula (1), the thermosetting epoxy resin composition of the present invention may optionally further contain a silane coupling agent, a filler such as silica and mica, a pigment, an antistatic agent and the like.

The silane coupling agent, as described in paragraphs 0007 to 0010 of Japanese Patent Application Laid-Open No. 2002-212537, has a function of cooperating with an aluminum chelating agent to initiate cationic polymerization of a thermosetting resin (for example, a thermosetting epoxy resin). Therefore, by including a small amount of such a silane coupling agent, the effect of promoting the curing of the epoxy resin can be obtained. The silane coupling agent has 1 to 3 lower alkoxyl groups in the molecule. Further, the silane coupling agent may have a group in the molecule that can react with the functional groups in the thermosetting resin, such as a vinyl group, a styryl group, an acryloyloxy group, a methacryloyloxy group, an epoxy group, an amino group, a mercapto group and the like. Further, since the latent curing agent of the present invention is a cationic curing agent, a coupling agent having an amino group or a mercapto group can also be used if the amino group or mercapto group does not essentially capture the generated cation species.

Specific examples of such a silane coupling agent include vinyltris(β-methoxyethoxy)silane, vinyltriethoxysilane, vinyltrimethoxysilane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane.

In the case of including a small amount of a silane coupling agent, no effect from adding the silane coupling agent can be expected if the included amount is too small, while if the included amount is too large, the silanolate anions produced from the silane coupling agent can cause a polymerization termination reaction. Therefore, the used amount of the silane coupling agent is 1 to 300 parts by mass, and preferably 1 to 100 parts by mass, with respect to 100 parts by mass of the aluminum chelate latent curing agent.

<Thermosetting Epoxy Resin Composition Preparation>

The thermosetting epoxy resin composition of the present invention can be prepared by uniformly mixing and stirring the aluminum chelate latent curing agent, the silanol compound represented by the formula (A), and the glycidyl ether epoxy compound, as well as additives as necessary, based on an ordinary method.

Since the thus-obtained thermosetting epoxy resin composition of the present invention can use an aluminum chelate latent curing agent as a curing agent, it has excellent storage stability despite the fact that it is a one-component type. Further, despite the fact that it includes a glycidyl ether epoxy compound, which until now could not be sufficiently cured with an aluminum chelate latent curing agent, the thermosetting epoxy resin composition can be cationically polymerized by low-temperature fast curing because it contains a specific silanol having high steric hindrance.

<Anisotropic Conductive Adhesive>

An example of a useful application for the thermosetting epoxy resin composition of the present invention is an anisotropic conductive adhesive. Such an anisotropic conductive adhesive has conductive particles dispersed in the thermosetting epoxy resin composition, and is used as a paste or by molding into a film. Examples of conductive particles that can be used include metal particles or metal-coated resin particles of nickel, cobalt, silver, copper, gold, palladium and the like, which have conventionally been used as conductive particles in anisotropic conductive adhesives. Two kinds or more of these particles may be used. Further, the particle size and added amount can be the same as that used conventionally. Such an anisotropic conductive adhesive can optionally include a filler, a softening agent, an accelerator, an antioxidant, a colorant (pigments and dyes), an organic solvent, an ion catcher and the like.

EXAMPLES

The present invention will now be described in more detail.

Example 1

Case where an Alicyclic Epoxy Compound was Included 800 parts by mass of distilled water, 0.05 parts by mass of a surfactant (Newrex R, NOF Corporation), and 4 parts by mass of polyvinyl alcohol (PVA-205, Kuraray Co., Ltd.) as a dispersant were added into a 3 liter interfacial polymerization vessel equipped with a thermometer, and the resultant mixture was uniformly mixed. To the mixed solution was added an oil phase solution prepared by dissolving the following in 30 parts by mass of ethyl acetate as a volatile organic solvent: 100 parts by mass of a 24% isopropanol solution of aluminum monoacetylacetonate bis(ethylacetoacetate) (Alumichelate D, Kawaken Fine Chemicals Co., Ltd.) as an aluminum chelate curing agent, 70 parts by mass of an adduct of trimethylolpropane (1 mole) with methylenediphenyl-4,4'-diisocyanate (3 moles) (D-109, Mitsui Chemicals, Inc.) as a polyfunctional isocyanate, and 70 parts by mass of 3,4-epoxycyclohexylmethyl-3,4-epoxycyclohexane carboxylate (Celloxide 2021P, manufactured by Daicel Chemical Industries, Ltd.)) as an alicyclic epoxy compound. The resultant mixture was emulsified and mixed using a homogenizer (T-50, IKA Japan; emulsifying conditions: 10,000 rpm/5 minutes), and then subjected to interfacial polymerization for 6 hours at 80° C.

After the reaction finished, the polymerization reaction solution was left to cool to room temperature. The interfacial polymerization particles were separated by filtration, and then left to dry naturally to obtain a mass. This mass was crushed using a crushing apparatus (AO-JET MILL, Seishin Enterprise Co., Ltd.) to obtain an aluminum chelate latent curing agent micro-encapsulated in a spherical core-shell form having an average particle size of 5 μm.

Then, 4 parts by mass of the obtained aluminum chelate latent curing agent, 8 parts by mass of triphenylsilanol (Tokyo Chemical Industry Co., Ltd.), and 80 parts by mass of a bisphenol A epoxy resin (EP828, Mitsubishi Chemical Corporation) were uniformly mixed to prepare the thermosetting epoxy resin composition of Example 1. The used triphenylsilanol had been dissolved in the bisphenol A epoxy resin by heating at 80° C. for 2 hours.

Example 2

Case where an Alicyclic Epoxy Compound was Included

An aluminum chelate latent curing agent micro-encapsulated in a spherical core-shell form having an average particle size of 5 μm by volume was obtained by repeating the same treatments as in Example 1, except that the used amount of the adduct of trimethylolpropane (1 mole) with methylenediphenyl-4,4'-diisocyanate (3 moles) (D-109, Mitsui Chemicals, Inc.) as a polyfunctional isocyanate was changed from 70 parts by mass to 50 parts by mass. In addition, a thermosetting epoxy resin composition was prepared in the same manner as in Example 1.

Figure 2:
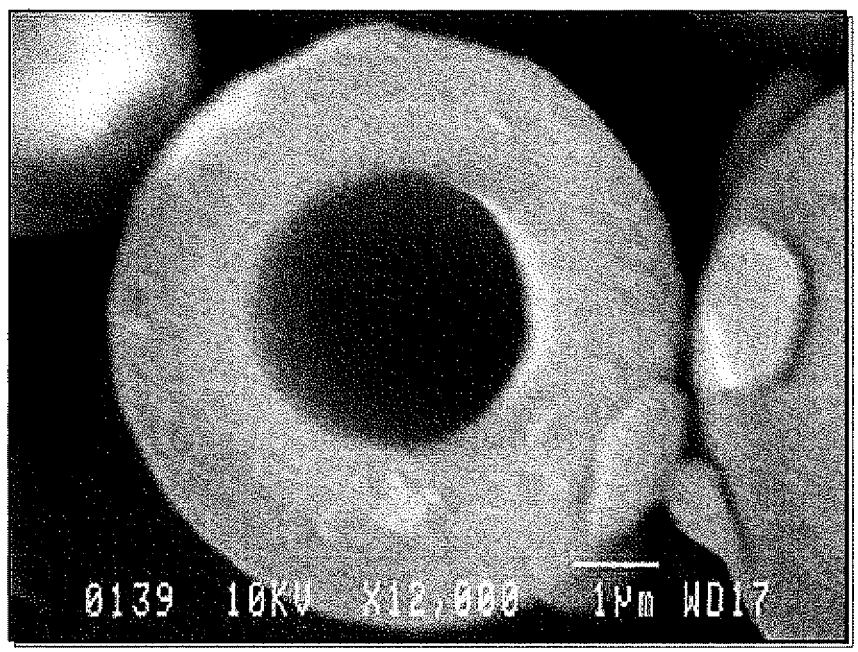
FIG. 2 is an electron micrograph of the aluminum chelate latent curing agent of Example 2.

Electron micrographs of the aluminum chelate latent curing agent of Example 2 are Shown in FIG. 1 (×1,000) and FIG. 2 (×12,000). From these electron micrographs, it can be seen that the aluminum chelate latent curing agent of Example 2 is a true spherical core-shell microcapsule.

<Detection of Cationic Polymerizable Compound in the Capsule by Purge and Trap GC/MS>

Figure 3:
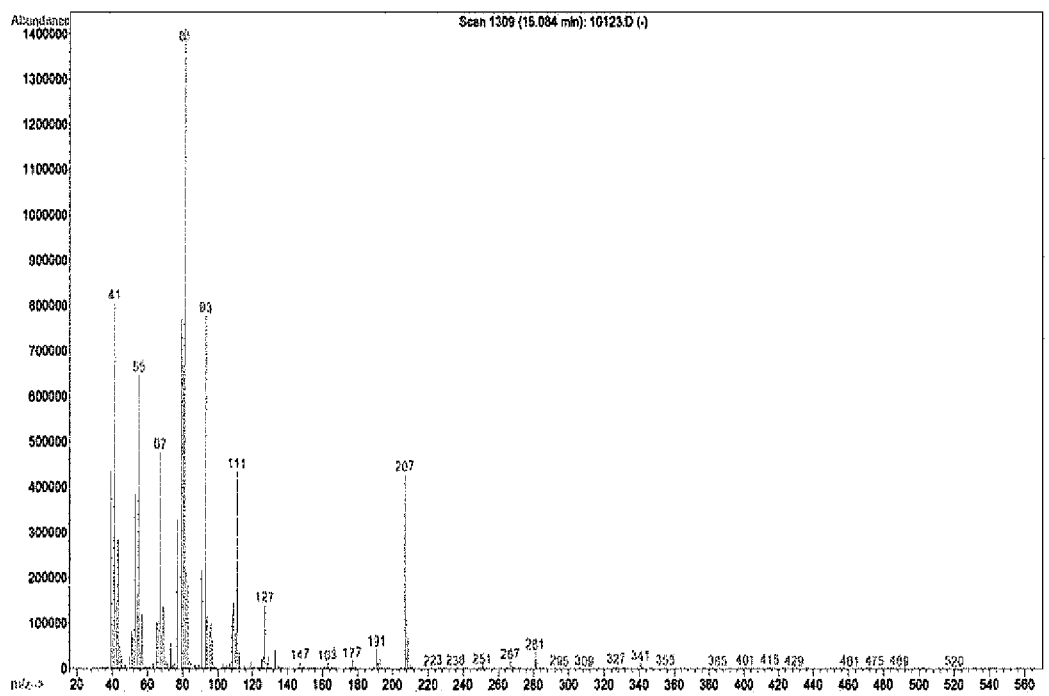
FIG. 3 is a purge and trap GC/MS chart of the aluminum chelate latent curing agent of Example 2.

FIG. 3 illustrates a purge and trap chart of the aluminum chelate latent curing agent of Example 2. A peak unique to Celloxide 2021P was detected at the 15.084 minute position in the chart. Therefore, it was confirmed that the cationic polymerizable compound included in the capsule had leaked from the capsule.

The purge and trap was carried out by heating for 15 minutes at 120° C. using a gas chromatography mass spectrometer (HP6890/5973 MS (Agilent)) equipped with a capillary column.

Comparative Example 1

Case where Divinyl Benzene/a Radical Polymerization Initiator were Included

An aluminum chelate latent curing agent in which the aluminum chelate curing agent is held in a spherical porous resin having an average particle size of 3 μm by volume was obtained by repeating the same treatments as in Example 1, except for using a solution prepared by dissolving the following in 100 parts by mass of ethyl acetate as the oil phase solution: 100 parts by mass of a 24% isopropanol solution of aluminum monoacetylacetonate bis(ethylacetoacetate) (Alumichelate D, Kawaken Fine Chemicals Co., Ltd.), 70 parts by mass of an adduct of trimethylolpropane (1 mole) with methylenediphenyl-4,4'-diisocyanate (3 moles) (D-109, Mitsui Chemicals, Inc.), 30 parts by mass of divinyl benzene, and 0.3 parts by mass of a radical polymerization initiator (Peroyl L, NOF Corporation). In addition, a thermosetting epoxy resin composition was prepared in the same manner as in Example 1.

<Evaluation of Examples 1 and 2 and Comparative Example 1>

The obtained thermosetting epoxy resin compositions were subjected to thermal analysis using a differential thermal analyzer (DSC) (DSC 6200, Seiko Instruments Inc.). The obtained results are shown in Table 1 and FIG. 4. Here, concerning the curing properties of the aluminum chelate latent curing agent, "exothermic onset temperature" refers to the temperature at which curing starts, "exothermic peak temperature" refers to the temperature at which curing is most active, and "exothermic end temperature" refers to the temperature at which curing ends. Further, the peak surface area refers to the gross heating value.

TABLE 1

| | EXOTHERMIC ONSET TEMPERATURE (° C.) | EXOTHERMIC PEAK TEMPERATURE (° C.) | GROSS HEATING VALUE (J/g) |
|---|---|---|---|
| Comparative Example 1 | 93.4 | 116.6 | 315 |
| Example 1 | 73.4 | 101.8 | 368 |
| Example 2 | 74.4 | 100.9 | 382 |

Figure 4:
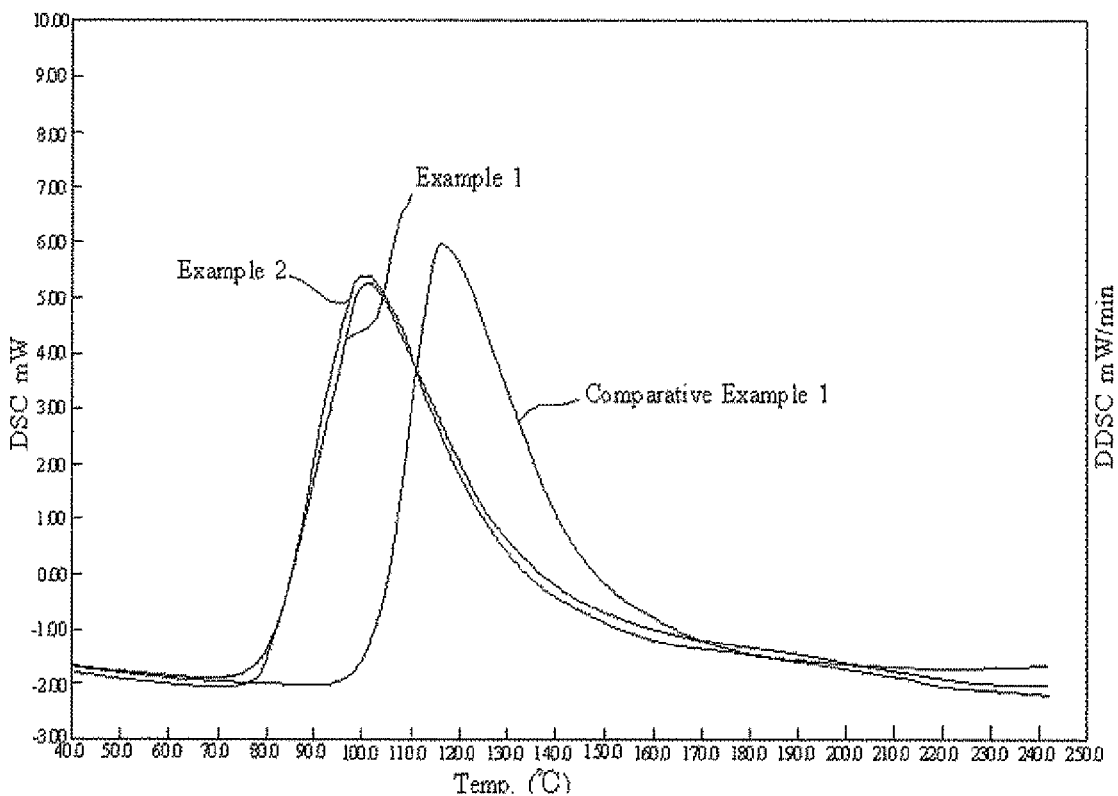
FIG. 4 is a DSC chart of the thermosetting epoxy resin compositions of Examples 1 and 2 and Comparative Example 1.

From Table 1 and FIG. 4, it can be seen that the thermosetting epoxy resin composition of Examples 1 and 2 that used an aluminum chelate latent curing agent produced by encapsulating an aluminum chelate curing agent and an alicyclic epoxy compound with the emulsification and interfacial polymerization product of a polyfunctional isocyanate had a lower exothermic peak temperature by about 15° C. and a lower exothermic onset temperature by about 20° C. than the thermosetting epoxy resin composition of Comparative Example 1 that included a curing agent which was produced by subjecting divinyl benzene to radical polymerization during the interfacial polymerization without micro-encapsulating a cationic polymerizable compound with a polyfunctional isocyanate.

Further, since the exothermic onset temperature of the thermosetting epoxy resin composition of Examples 1 and 2 exceeded 70° C., this compound had excellent storage properties at room temperature and impeccable latency as a curing agent.

Moreover, an aluminum chelate curing agent and a thermosetting epoxy resin composition obtained by repeating the same treatments as in Comparative Example 1 except for not using divinyl benzene or a radical polymerization initiator had an exothermic onset temperature and an exothermic peak temperature that shifted higher by about 20° C. compared with Comparative Example 1. Thus, it should also be stated that there was a problem with low-temperature fast-curing properties.

Example 3

Case where an Oxetane Compound was Included

An aluminum chelate latent curing agent micro-encapsulated in a spherical core-shell form having an average particle size of 5 μm by volume was obtained by repeating the same operations of Example 2, except that an oxetane compound (di[1-ethyl(3-oxentanyl)]methylether (OXT-221, Toagosei Co., Ltd.)) was used instead of the 3,4-epoxycyclohexylmethyl-3,4-epoxycyclohexane carboxylate, which is an alicyclic compound. In addition, a thermosetting epoxy resin composition was prepared in the same manner as in Example 1.

Figure 5:
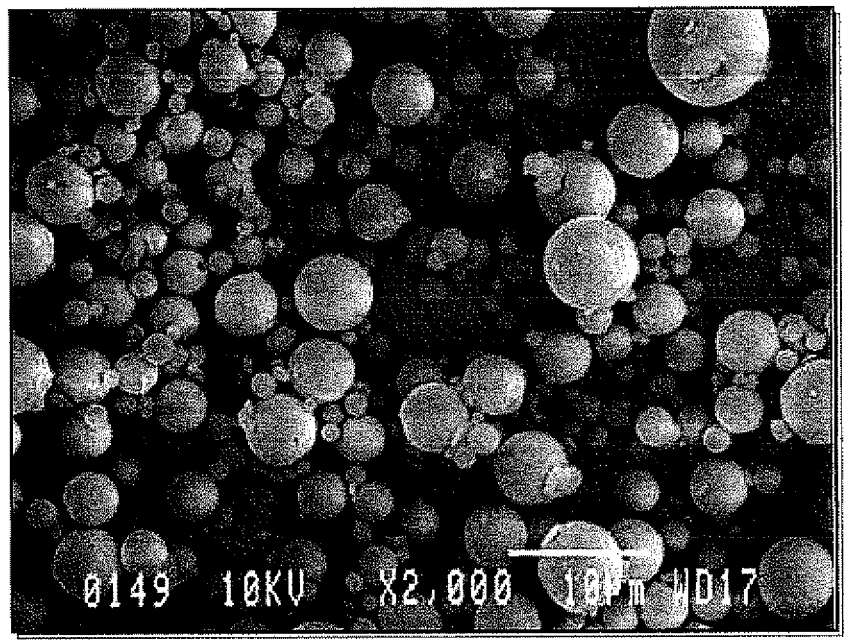
FIG. 5 is an electron micrograph of the aluminum chelate latent curing agent of Example 3.
Figure 6:
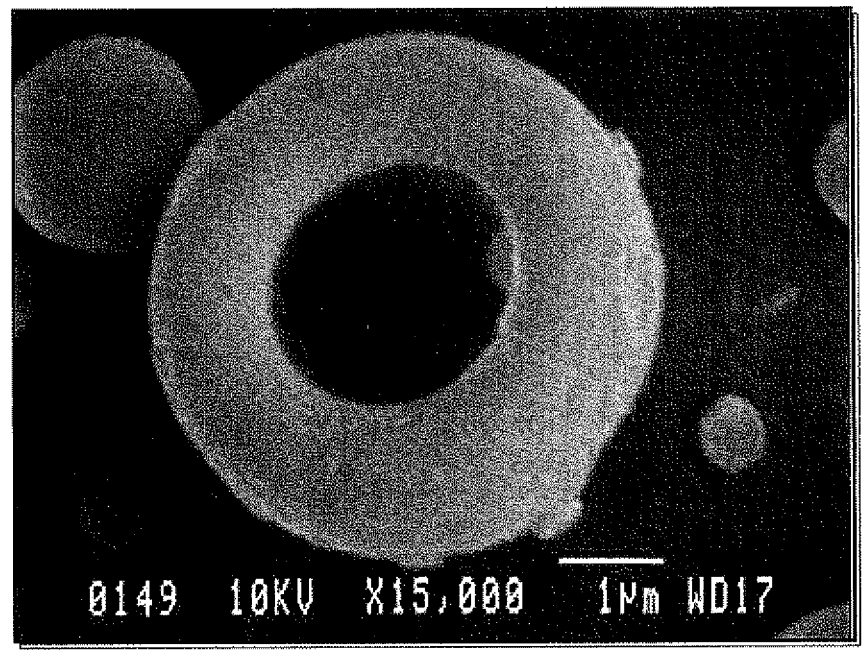
FIG. 6 is an electron micrograph of the aluminum chelate latent curing agent of Example 3.

Electron micrographs of the aluminum chelate latent curing agent of Example 3 are shown in FIG. 5 (×2,000) and FIG. 6 (×15,000). From these electron micrographs, it can be seen that the aluminum chelate latent curing agent of Example 3 is a true spherical core-shell microcapsule.

<Detection of Cationic Polymerizable Compound in the Capsule by Purge and Trap GC/MS>

Figure 7:
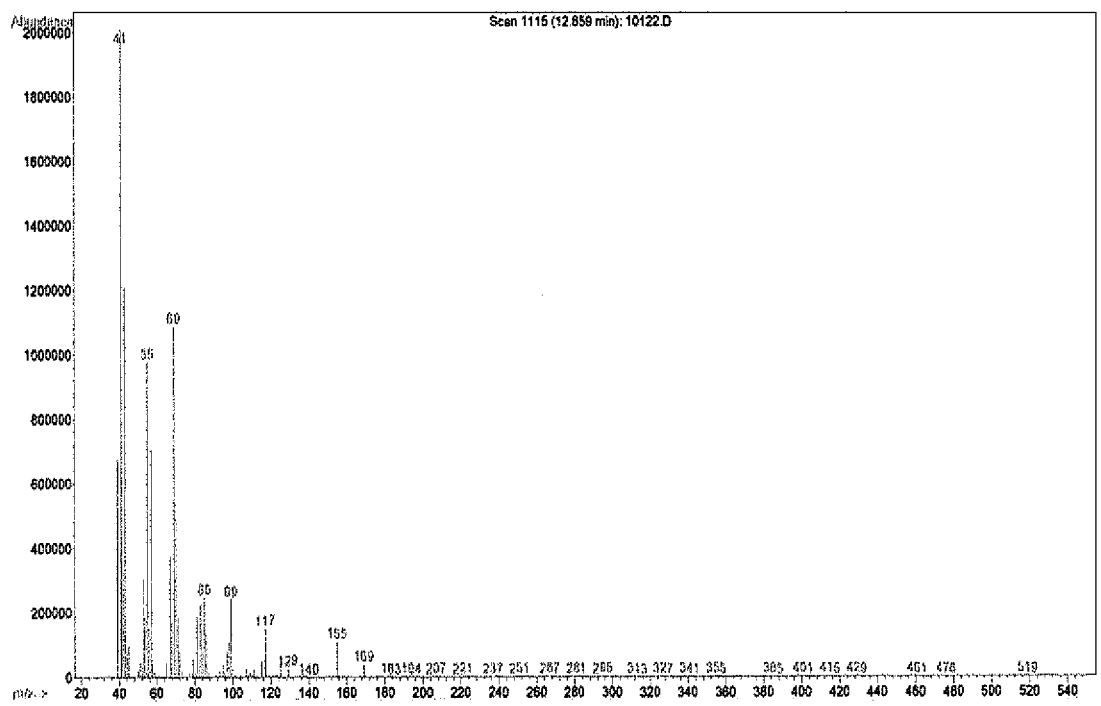
FIG. 7 is a purge and trap GC/MS chart of the aluminum chelate latent curing agent of Example 3.

FIG. 7 illustrates a purge and trap chart of the aluminum chelate latent curing agent of Example 3. A peak unique to OXT-221 was detected at the 12.859 minute position in the chart. Therefore, it was confirmed that the cationic polymerizable compound included in the capsule had leaked from the capsule by heating.

The purge and trap was the same as in Example 2.

<Evaluation of Example 3>

The obtained thermosetting epoxy resin compositions were subjected to thermal analysis using a differential thermal analyzer (DSC) (DSC 6200, Seiko Instruments Inc.). The obtained results are shown in Table 2 and FIG. 8. For comparison, the results of Example 2 are also shown.

TABLE 2

| | EXOTHERMIC ONSET TEMPERATURE (° C.) | EXOTHERMIC PEAK TEMPERATURE (° C.) | GROSS HEATING VALUE (J/g) |
|---|---|---|---|
| Example 2 | 74.4 | 100.9 | 382 |
| Example 3 | 80.7 | 104.6 | 392 |

Figure 8:
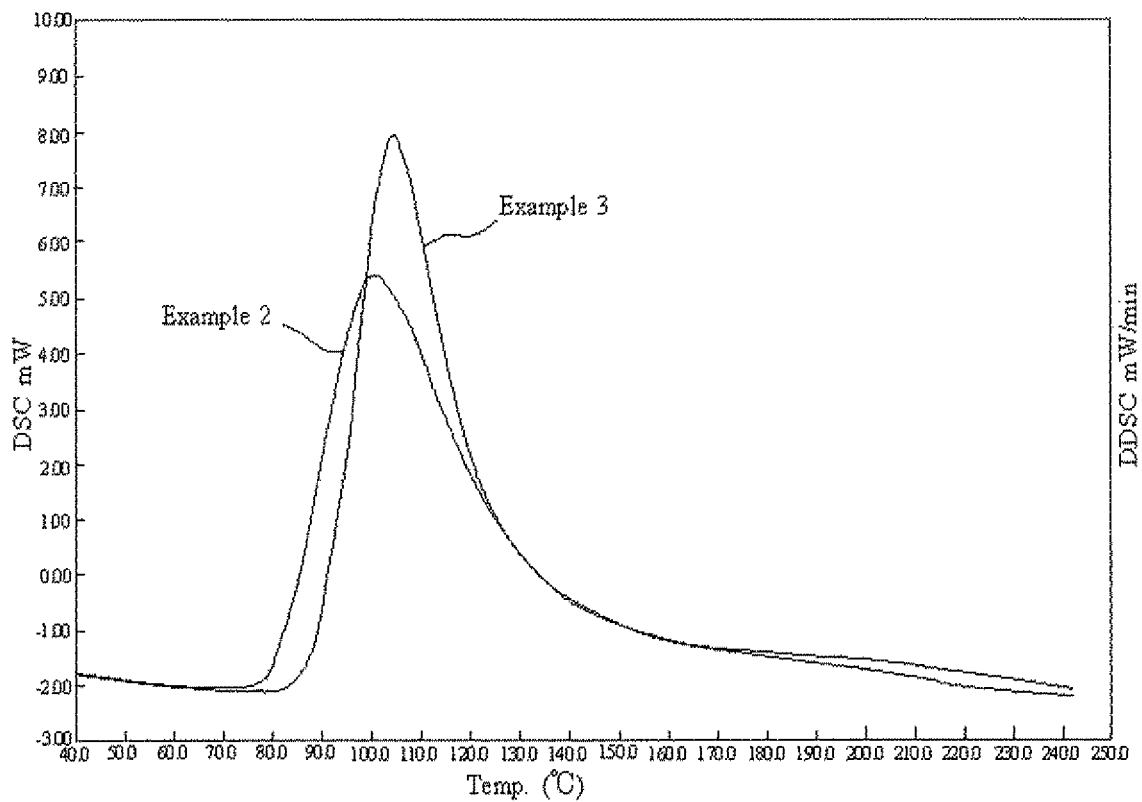
FIG. 8 is a DSC chart of the thermosetting epoxy resin compositions of Examples 2 and 3.

From Table 2 and FIG. 8, it can be seen that by using an oxetane compound instead of an alicyclic epoxy compound, the exothermic peak is sharper and the fast-curing properties are improved.

Example 4

Case where an Oxetane Compound was Included

An aluminum chelate latent curing agent micro-encapsulated in a spherical core-shell form having an average particle size of 5 μm by volume of Example 4 was obtained by repeating the same operations of Example 3, except that the added amount of the polyfunctional isocyanate was changed from 50 parts by mass to 40 parts by mass. In addition, a thermosetting epoxy resin composition was prepared in the same manner as in Example 1.

Figure 9:
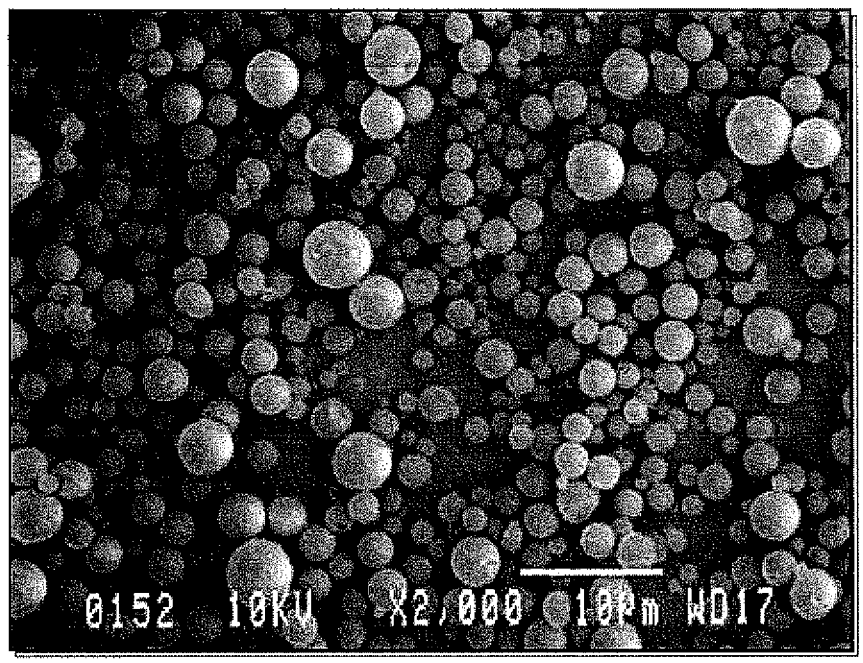
FIG. 9 is an electron micrograph of the aluminum chelate latent curing agent of Example 4.
Figure 10:
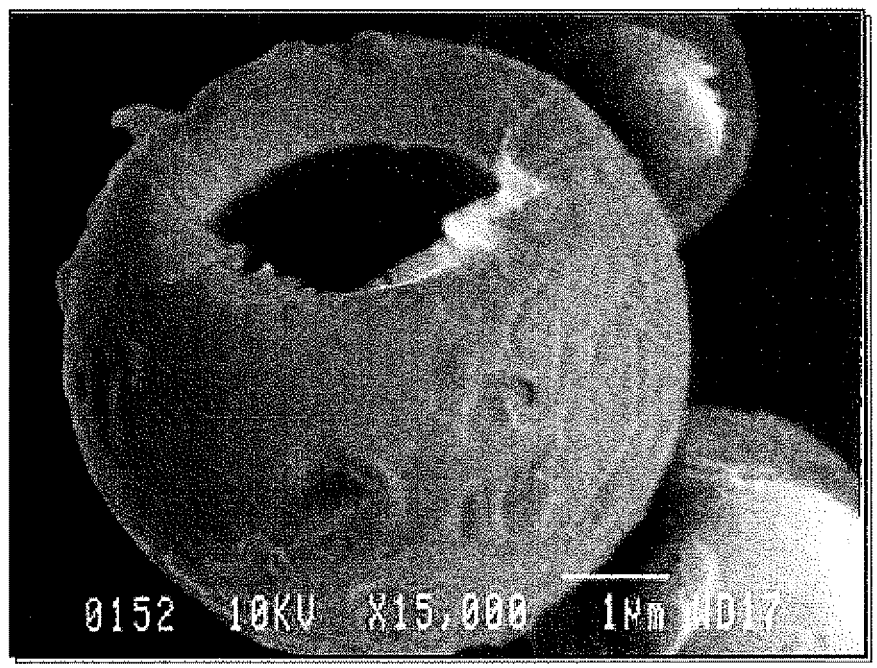
FIG. 10 is an electron micrograph of the aluminum chelate latent curing agent of Example 4.

Electron micrographs of the aluminum chelate latent curing agent of Example 4 are shown in FIG. 9 (×2,000) and FIG. 10 (×15,000). From these electron micrographs, it can be seen that the aluminum chelate latent curing agent of Example 4 is a true spherical core-shell microcapsule.

Example 5

Case where an Oxetane Compound was Included

An aluminum chelate latent curing agent micro-encapsulated in a spherical core-shell form having an average particle size of 5 μm by volume of Example 5 was obtained by repeating the same operations of Example 3, except that the added amount of the polyfunctional isocyanate was changed from 50 parts by mass to 30 parts by mass. In addition, a thermosetting epoxy resin composition was prepared in the same manner as in Example 1.

<Evaluation of Examples 4 and 5>

The obtained thermosetting epoxy resin compositions were subjected to thermal analysis using a differential thermal analyzer (DSC) (DSC 6200, Seiko Instruments Inc.). The obtained results are shown in Table 3 and FIG. 11. For comparison, the results of Example 3 are also shown.

TABLE 3

| | EXOTHERMIC ONSET TEMPERATURE (° C.) | EXOTHERMIC PEAK TEMPERATURE (° C.) | GROSS HEATING VALUE (J/g) |
|---|---|---|---|
| Example 3 | 80.7 | 104.6 | 392 |
| Example 4 | 75.7 | 97.2 | 474 |
| Example 5 | 72.7 | 97.0 | 406 |

Figure 11:
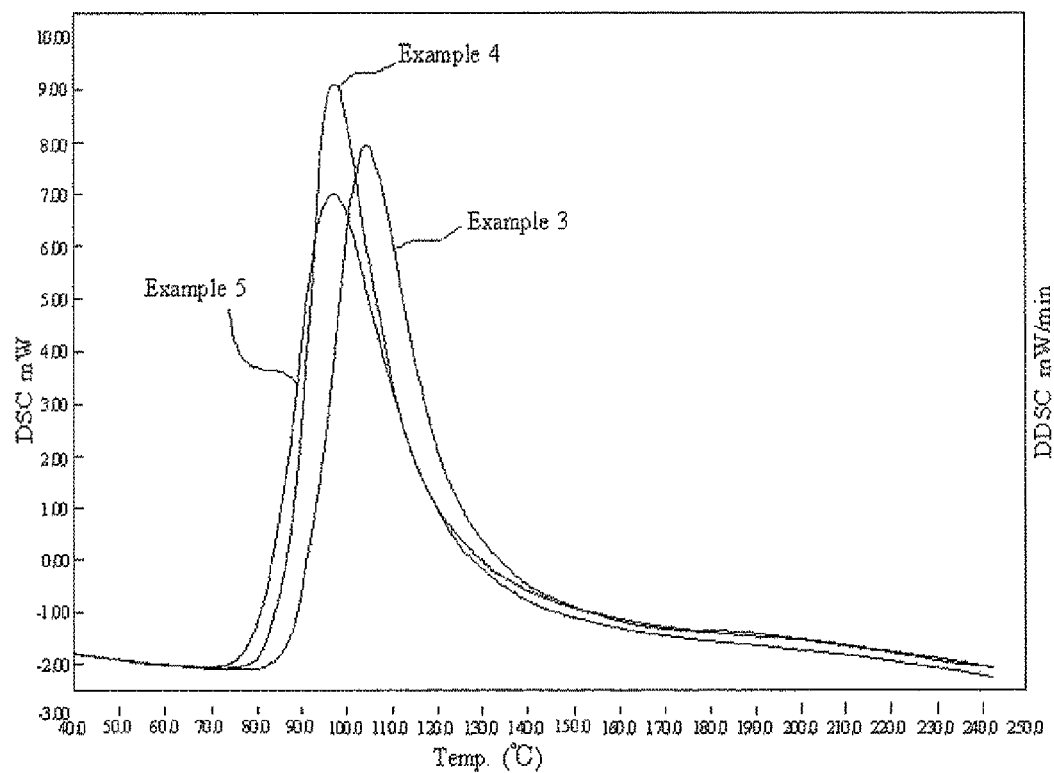
FIG. 11 is a DSC chart of the thermosetting epoxy resin compositions of Examples 3, 4 and 5.

From the results of Table 3 and FIG. 11, it can be seen that the exothermic peak temperature can be shifted to a lower temperature by reducing the added amount of polyfunctional isocyanate. Example 4 exhibited the largest gross heating value.

Example 6

Case where an Oxetane Compound was Included, and Also an Aluminum Chelate Curing Agent was Impregnated An aluminum chelate latent curing agent impregnated with an aluminum chelate curing agent was obtained by adding 10 parts by mass of the aluminum chelate latent curing agent obtained in Example 3 into a mixed solution formed from 40 parts by mass of a 24% isopropanol solution of aluminum monoacetylacetonate bis(ethylacetoacetate) (Alumichelate D, Kawaken Fine Chemicals Co., Ltd.) and 60 parts by mass of ethanol, stirring the resultant mixture for 6 hours at 30° C., then filtering and washing with cyclohexane, and drying under a vacuum (60° C., 4 hours). In addition, a thermosetting epoxy resin composition was prepared in the same manner as in Example 1.

<Evaluation of Example 6>

The obtained thermosetting epoxy resin composition was subjected to thermal analysis using a differential thermal analyzer (DSC) (DSC 6200, Seiko Instruments Inc.). The obtained results are shown in Table 4 and FIG. 12. For comparison, the results of Example 3 are also shown.

TABLE 4

| | EXOTHERMIC ONSET TEMPERATURE (° C.) | EXOTHERMIC PEAK TEMPERATURE (° C.) | GROSS HEATING VALUE (J/g) |
|---|---|---|---|
| Example 3 | 80.7 | 104.6 | 392 |
| Example 6 | 69.8 | 85.4 | 415 |

Figure 12:
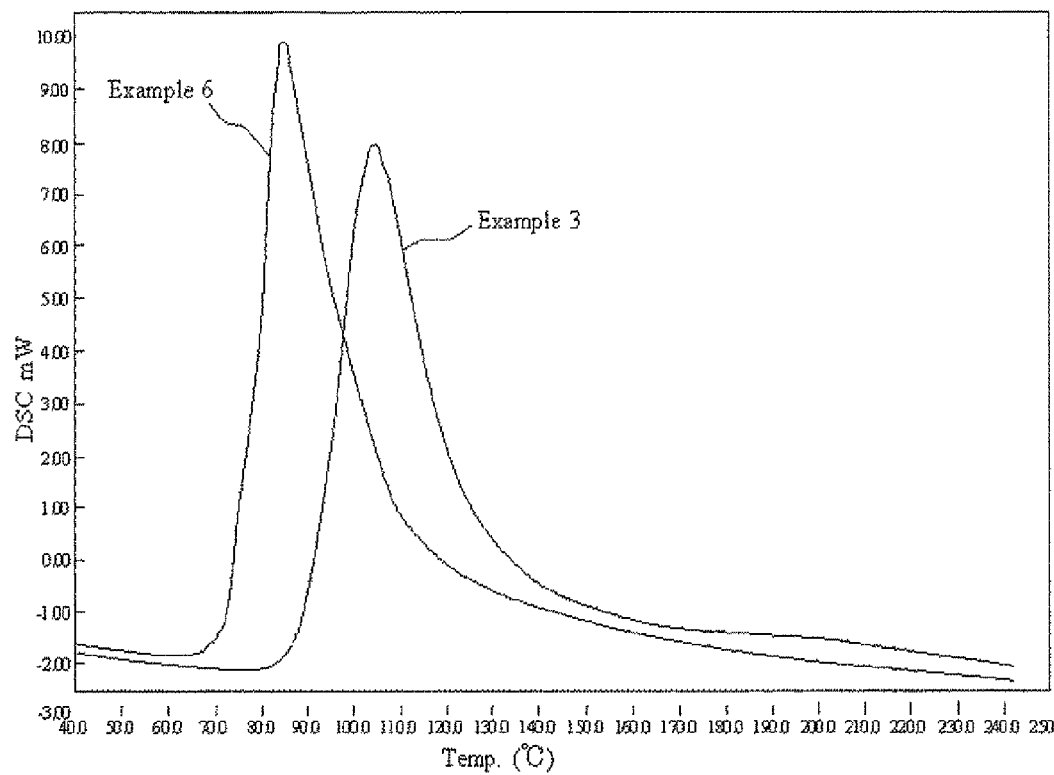
FIG. 12 is a DSC chart of the thermosetting epoxy resin compositions of Examples 3 and 6.

From the results of Table 4 and FIG. 12, it can be seen that by impregnating an aluminum chelate curing agent into the wall of a microcapsule, the exothermic peak temperature can be shifted to a lower temperature, and the low-temperature curing properties can be improved. In this case too, since the exothermic onset temperature is approximately 70° C., room temperature storage stability is excellent.

Example 7

Case where a Glycidyl Ether Epoxy Compound was Included

An aluminum chelate latent curing agent micro-encapsulated in a spherical core-shell form having an average particle size of 5 μm by volume of Example 7 was obtained by repeating the same operations of Example 2, except that 50 parts by mass of trimethyol propane glycidyl ether (Epolight 100MF, Kyoeisha Chemical Co., Ltd.) as a glycidyl ether epoxy compound was used instead of the 50 parts by mass of the alicyclic epoxy compound. In addition, a thermosetting epoxy resin composition was prepared in the same manner as in Example 1.

Comparative Example 2

Case where a High Boiling Point Lipophilic Solvent was Included

An aluminum chelate latent curing agent micro-encapsulated in a spherical core-shell form having an average particle size of 5 μm by volume of Comparative Example 2 was obtained by repeating the same operations of Example 2, except that 50 parts by mass of dibenzyl toluene (B-18, Matsumura Oil Co., Ltd.) having a boiling point of 390° C. was used instead of the 50 parts by mass of the alicyclic epoxy compound. In addition, thermosetting epoxy resin composition was prepared in the same manner as in Example 1.

<Evaluation of Example 7 and Comparative Example 2>

The obtained thermosetting epoxy resin compositions were subjected to thermal analysis using a differential thermal analyzer (DSC) (DSC 6200, Seiko Instruments Inc.). The obtained results are shown in Table 5 and FIG. 13. For comparison, the results of Examples 2 and 3 are also shown.

TABLE 5

| | CATIONIC POLYMERIZABLE COMPOUND | EXOTHERMIC ONSET TEMPERATURE (° C.) | EXOTHERMIC PEAK TEMPERATURE (° C.) | GROSS HEATING VALUE (J/g) |
|---|---|---|---|---|
| Example 2 | ALICYCLIC EPOXY COMPOUND | 74.4 | 100.9 | 382 |
| Example 3 | OXETANE COMPOUND | 80.7 | 104.6 | 392 |
| Example 7 | GLYCIDYL ETHER EPOXY RESIN | 69.4 | 110.1 | 336 |
| Comparative Example 2 | NONE (DIBENZYL TOLUENE) | 52.8 | 104.3 | 315 |

Figure 13:
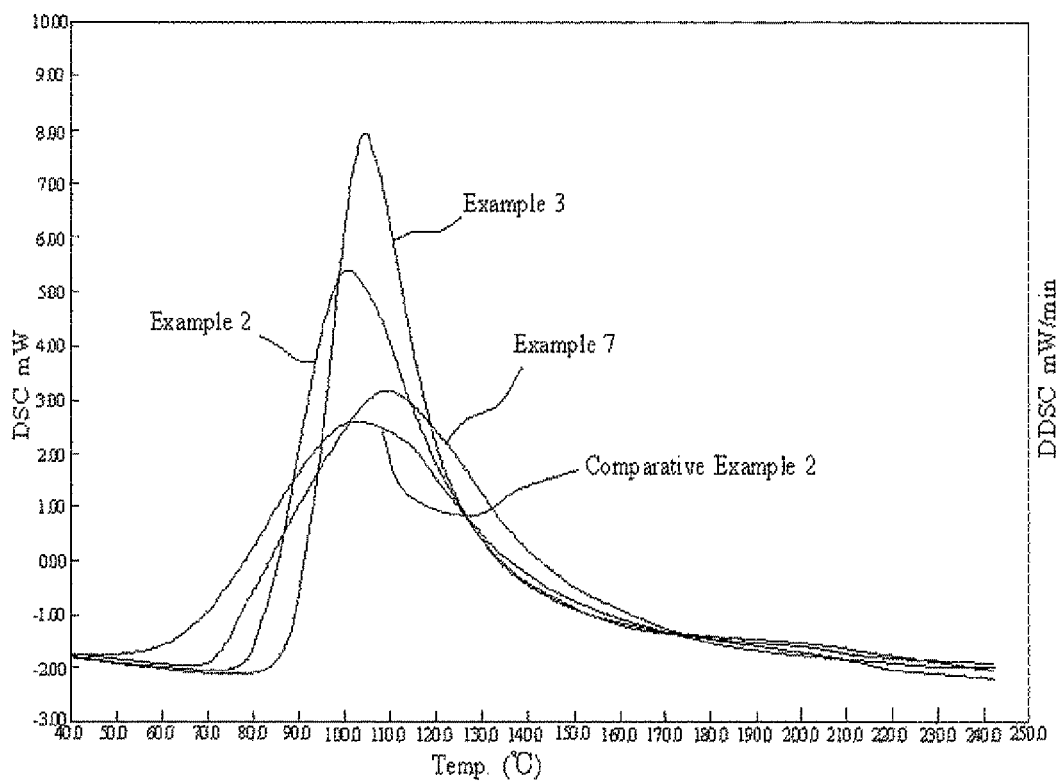
FIG. 13 is a DSC chart of the thermosetting epoxy resin compositions of Examples 2, 3, and 7 and Comparative Example 2.

From the results of Table 5 and FIG. 13, it can be seen that Example 7, in which a glycidyl ether epoxy compound was included in the microcapsule, exhibited slightly poorer latency (onset temperature) and fast-curing properties (gross heating value) than Examples 2 and 3, in which an alicyclic epoxy compound or an oxetane compound was included. This is thought to be because the viscosity (catalog value) at 25° C. of the glycidyl ether epoxy compound (Epolight 100MF) used in Example 7 was low, at 100 to 160 mPa·s, so that the fluidity in the capsule improved. Accordingly, although the polymerization onset temperature could be decreased, the glycidyl ether epoxy compound had a lower cationic polymerizability than the alicyclic epoxy compound or oxetane compound.

Further, from the results of Comparative Example 2, it can be seen that when a high boiling point lipophilic solvent that is used in normal interfacial polymerization is included, sufficient latency cannot be realized. This is thought to be because interfacial polymerization in the microcapsule is hindered, which causes the capsule wall strength to deteriorate.

Comparative Example 3

Case where Divinyl Benzene and a Radical Polymerization Initiator were Included

An aluminum chelate latent curing agent of Comparative Example 3 was obtained by repeating the same operations of Example 3, except that the added amount of the polyfunctional isocyanate was changed from 50 parts by mass to 40 parts by mass, and that 10 parts by mass of divinyl benzene (Merck) and 0.1 parts by mass of a radical polymerization initiator (Peroyl L, NOF Corporation) were additionally added. In addition, a thermosetting epoxy resin composition was prepared in the same manner as in Example 1.

Comparative Example 4

Case where Divinyl Benzene and a Radical Polymerization Initiator were Included

An aluminum chelate latent curing agent of Comparative Example 4 was obtained by repeating the same operations of Example 3, except that the added amount of the polyfunctional isocyanate was changed from 50 parts by mass to 30 parts by mass, and that 20 parts by mass of divinyl benzene (Merck) and 0.2 parts by mass of a radical polymerization initiator (Peroyl L, NOF Corporation) were additionally added. In addition, a thermosetting epoxy resin composition was prepared in the same manner as in Example 1.

<Evaluation of Comparative Examples 3 and 4>

The obtained thermosetting epoxy resin compositions were subjected to thermal analysis using a differential thermal analyzer (DSC) (DSC 6200, Seiko Instruments Inc.). The obtained results are shown in Table 6 and FIG. 14. For comparison, the results of Example 3 are also shown.

TABLE 6

| | EXOTHERMIC ONSET TEMPERATURE (° C.) | EXOTHERMIC PEAK TEMPERATURE (° C.) | GROSS HEATING VALUE (J/g) |
|---|---|---|---|
| Example 3 | 80.7 | 104.6 | 392 |
| Comparative Example 3 | 82.0 | 108.4 | 309 |
| Comparative Example 4 | 82.5 | 115.1 | 314 |

Figure 14:
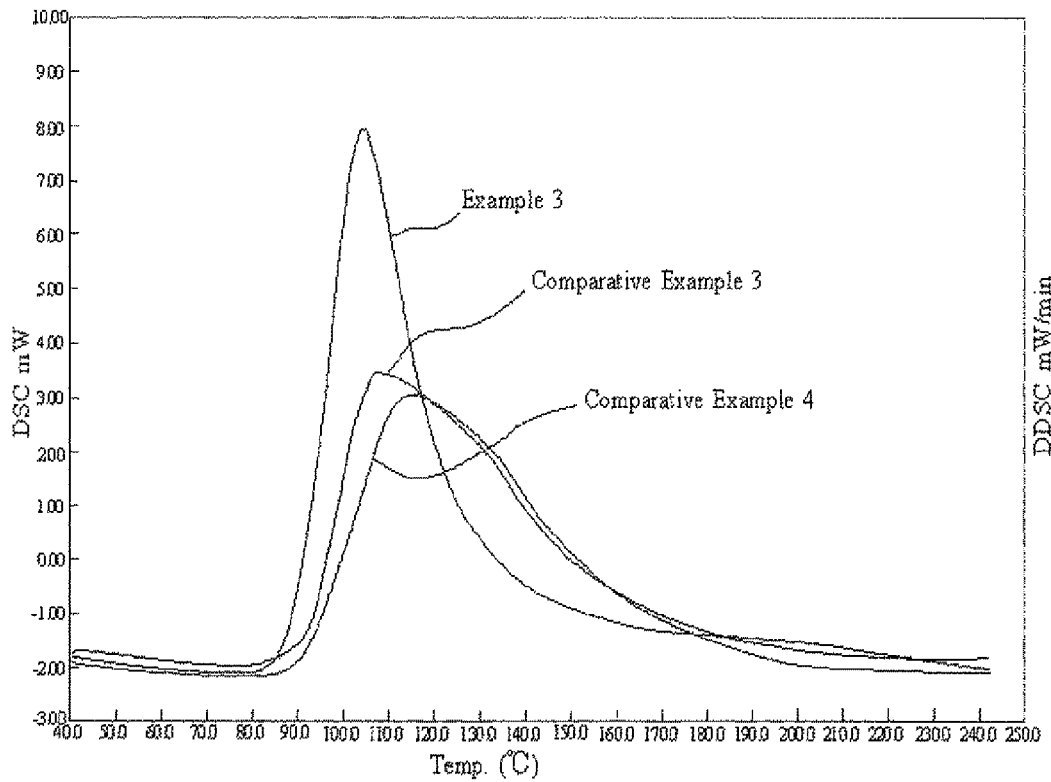
FIG. 14 is a DSC chart of the thermosetting epoxy resin compositions of Example 3 and Comparative Examples 3 and 4.

From Table 6 and FIG. 14, it can be seen that in Comparative Examples 3 and 4, in which a radical polymerizable compound was used in addition to a cationic polymerizable compound, the exothermic onset temperature and the exothermic peak temperature shifted to a higher temperature, and yet the peaks were broad. This is considered to be because radical polymerization of the radical polymerizable compound occurred in parallel with interfacial polymerization not only on the capsule surface, but also in the capsule interior, which prevented a good core-shell structure from being formed.

INDUSTRIAL APPLICABILITY

The aluminum chelate latent curing agent of the present invention can cure an inexpensive and general-purpose glycidyl ether epoxy resin as an epoxy resin at a low-temperature and in a short time. Therefore, the aluminum chelate latent curing agent of the invention is useful as a curing agent for a general-purpose epoxy resin composition.

The invention claimed is:

1. A micro-encapsulated aluminum chelate latent curing agent in a core-shell form, comprising:
   a microcapsule wall, formed from an interfacial polymerization product of a polyfunctional isocyanate; and
   an aluminum chelate curing agent and a cationic polymerizable compound encapsulated by the microcapsule wall,
   wherein a radical polymerizable compound and a silanol compound are not encapsulated by the microcapsule wall.

2. The micro-encapsulated aluminum chelate latent curing agent according to claim 1, wherein the cationic polymerizable compound is a cyclic ether compound.

3. The micro-encapsulated aluminum chelate latent curing agent according to claim 2, wherein the cyclic ether compound is an alicyclic epoxy compound and/or an oxetane compound.

4. The micro-encapsulated aluminum chelate latent curing agent according to claim 1, wherein the microcapsule wall is subjected to an impregnation treatment of an aluminum chelate curing agent solution.

5. The micro-encapsulated aluminum chelate latent curing agent according to claim 1, wherein the cationic polymerizable compound is encapsulated by the microcapsule wall in an amount of 10 to 300 parts by mass with respect to 100 parts by mass of the aluminum chelate curing agent.

6. The micro-encapsulated aluminum chelate latent curing agent according to claim 1, wherein the aluminum chelate curing agent and the cationic polymerizable compound are encapsulated by the microcapsule wall in a total amount of 100 to 2,000 parts by mass with respect to 100 parts by mass of the microcapsule wall.

7. A production method of the micro-encapsulated aluminum chelate latent curing agent according to claim 1, comprising:
   dissolving the polyfunctional isocyanate, the aluminum chelate curing agent and the cationic polymerizable compound in a volatile organic solvent in an aqueous phase containing water, a dispersant, and a surfactant to form an oil phase;
   emulsifying the oil phase; and
   subjecting the polyfunctional isocyanate to interfacial polymerization while maintaining the emulsified state, to allow the aluminum chelate curing agent and the cationic polymerizable compound to be encapsulated by the microcapsule wall formed from the interfacial polymerization product of the polyfunctional isocyanate.

8. The production method according to claim 7, wherein a ratio of an amount of the volatile organic solvent in the oil phase is from 1 to 50 parts by mass with respect to 100 parts by mass of a total amount of the aluminum chelate curing agent, the polyfunctional isocyanate compound, and the cationic polymerizable compound.

9. A thermosetting epoxy resin composition, comprising the micro-encapsulated aluminum chelate latent curing agent according to claim 1, a glycidyl ether epoxy compound, and a silanol compound represented by the formula (A), $$(Ar)_m Si(OH)_n \tag{A}$$

wherein m is 2 or 3, the sum of m and n is 4, and Ar represents an optionally substituted aryl group.

10. The thermosetting epoxy resin composition according to claim 9, wherein the silanol compound is triphenylsilanol or diphenylsilanol.

11. The thermosetting epoxy resin composition according to claim 9, wherein a content ratio of the silanol compound to a total amount of the silanol compound and the glycidyl ether epoxy resin in the thermosetting epoxy resin composition is from 5 to 30 mass %.

12. The thermosetting epoxy resin composition according to claim 9, wherein the glycidyl ether epoxy compound is a bisphenol A epoxy compound and/or a bisphenol F epoxy compound.

13. The thermosetting epoxy resin composition according to claim 9, further comprising an oxetane compound.

14. An anisotropic conductive adhesive, comprising the thermosetting epoxy resin composition according to claim 9, and a conductive particle dispersed in the composition.

15. A film comprising the anisotropic conductive adhesive according to claim 14.

* * * * *